US007085252B1

(12) United States Patent
Kuroiwa et al.

(10) Patent No.: US 7,085,252 B1
(45) Date of Patent: Aug. 1, 2006

(54) CELL SEARCH METHOD, COMMUNICATION SYNCHRONIZATION APPARATUS, PORTABLE TERMINAL APPARATUS, AND RECORDING MEDIUM

(75) Inventors: Koichi Kuroiwa, Kawasaki (JP); Masami Kanasugi, Kawasaki (JP); Mahiro Hikita, Kawasaki (JP); Shoji Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/540,878

(22) Filed: Mar. 31, 2000

(30) Foreign Application Priority Data

| Apr. 28, 1999 | (JP) | 11-121782 |
| Jun. 30, 1999 | (JP) | 11-185714 |
| Dec. 28, 1999 | (JP) | 11-373252 |

(51) Int. Cl.
*H04B 7/216* (2006.01)

(52) U.S. Cl. ............... 370/335; 370/342; 370/350; 375/142; 375/145; 375/149; 375/150

(58) Field of Classification Search ............ 370/342, 370/350, 335, 441, 479, 503; 375/142, 143, 375/150, 151, 140, 141, 145, 147, 149
See application file for complete search history.

(56) References Cited

U.S. PATENT DOCUMENTS

| 3,680,055 | A | * | 7/1972 | Wilson | 710/57 |
| 4,292,676 | A | | 9/1981 | Henig | |
| 5,420,850 | A | * | 5/1995 | Umeda et al. | 370/342 |
| 5,530,716 | A | | 6/1996 | Lipa | |
| 5,544,155 | A | * | 8/1996 | Lucas et al. | 370/342 |
| 5,710,768 | A | | 1/1998 | Ziv | |
| 5,805,648 | A | | 9/1998 | Sutton | |
| 5,825,835 | A | * | 10/1998 | Kingston et al. | 375/367 |
| 5,910,948 | A | * | 6/1999 | Shou et al. | 370/335 |
| 5,960,048 | A | * | 9/1999 | Haartsen | 375/366 |
| 5,995,434 | A | * | 11/1999 | Ryu | 365/222 |
| 6,011,709 | A | * | 1/2000 | Tanaka et al. | 365/49 |
| 6,075,809 | A | * | 6/2000 | Naruse | 375/147 |
| 6,108,370 | A | * | 8/2000 | Naruse | 375/150 |
| 6,115,725 | A | * | 9/2000 | Shibata et al. | 708/203 |
| 6,147,982 | A | * | 11/2000 | Sourour et al. | 370/324 |

(Continued)

FOREIGN PATENT DOCUMENTS

EP 0 116 774 A2 8/1984

(Continued)

OTHER PUBLICATIONS

"Design of an All-Digital Receiver for Narrowband Continuous-Phase Asynchronous CDMA Systems," Giannetti et al., Proceedings of the International Conference on Communications, *IEEE*, vol. 3, pp. 468-472 (May 1993).

(Continued)

*Primary Examiner*—Alpus H. Hsu
(74) *Attorney, Agent, or Firm*—Arent Fox PLLC

(57) ABSTRACT

A power threshold value (12) is set to be compared with a correlation power value detected by a correlator (2) and a power conversion section (4). As a result of comparison by a comparator (13), only the correlation power values that exceed the threshold value (12) are stored in a power value memory (14), and unnecessary correlation values at noise levels are not stored in the memory (14) so that the number of power values stored can be decreased. With this construction, the necessary memory capacity can be decreased, and the process of searching for the maximum value from the correlation power values stored in the memory (14) can be performed at a higher speed.

45 Claims, 10 Drawing Sheets

FLOW CHART SHOWING CELL SEARCH OPERATION OF FIRST EMBODIMENT

U.S. PATENT DOCUMENTS

| | | | |
|---|---|---|---|
| 6,167,037 A * | 12/2000 | Higuchi et al. | 370/335 |
| 6,188,682 B1 * | 2/2001 | Takagi et al. | 370/342 |
| 6,310,856 B1 * | 10/2001 | Taipale | 370/208 |
| 6,345,045 B1 * | 2/2002 | Yanagi | 370/342 |
| 6,405,321 B1 * | 6/2002 | Segars | 713/400 |
| 6,553,059 B1 * | 4/2003 | Ito | 375/150 |
| 6,782,041 B1 * | 8/2004 | Aihara | 375/150 |
| 6,829,291 B1 * | 12/2004 | Imaizumi | 375/150 |

FOREIGN PATENT DOCUMENTS

| | | |
|---|---|---|
| EP | 0 942 543 | 9/1999 |
| JP | 2-14634 | 1/1990 |
| JP | 5-36268 | 2/1993 |
| JP | 8-154083 | 6/1996 |
| JP | 10-190522 | 7/1998 |
| JP | 10-200505 | 7/1998 |
| JP | 11-17649 | 1/1999 |
| JP | 11-261446 | 9/1999 |

OTHER PUBLICATIONS

TSG Ran Working Group 1: "Physical Channels and Mapping of Transport Channels onto Physical Channels, Synchronisation Procedures,", TS 25.211 V2.0.0, Third Generation Partnership Project, Apr. 22, 1999, p. 26.

TSG Ran Working Group 1: "Physical Layer Procedures," TS 25.214 V2.0.0 (Apr. 1999), Third Generation Partnership Project, p. 6.

Stephen S. Rappaport and Donald M. Gricco, "Spread-Spectrum Signal Acquisition: Methods and Technology," IEEE Communications Magazine, IEEE Service Center, Piscataway, NJ, vol. 22, No. 6, Jun. 1, 1984, pp. 6-12.

* cited by examiner

FLOW CHART SHOWING CELL SEARCH OPERATION OF FIRST EMBODIMENT

FIG. 6 BLOCK DIAGRAM OF CELL SEARCH OF SECOND EMBODIMENT

FLOW CHART SHOWING CELL SEARCH OPERATION
OF SECOND EMBODIMENT

BLOCK DIAGRAM OF CELL SEARCH OF THIRD EMBODIMENT

BLOCK DIAGRAM OF CORRELATOR OF THIRD EMBODIMENT

CELL SEARCH METHOD, COMMUNICATION SYNCHRONIZATION APPARATUS, PORTABLE TERMINAL APPARATUS, AND RECORDING MEDIUM

BACKGROUND OF THE INVENTION

1. Field of the Invention

The present invention relates to a cell search method, a communication synchronization apparatus, a portable terminal apparatus, and a recording medium storing a program for realizing the method and the apparatus by a function of software and, more particularly, to a method and an apparatus suitably used, e.g., to establish synchronization between a mobile communication terminal such as a portable telephone and a base station.

2. Description of the Related Art

Conventionally, in analog FDMA (Frequency Division Multiple Access) for connecting mobile stations such as portable telephones to one base station using different frequencies, one frequency band is exclusively used for communication by one mobile station. This decreases the utilization efficiency of the divided frequency bands and also makes it impossible to increase the number of users in the service area (cell) of the base station.

Currently, digital TDMA (Time Division Multiple Access) for time-divisionally connecting one frequency band to mobile stations is often used in place of FDMA. According to this scheme, since two or more mobile stations can be assigned to one frequency band for communication, the number of users can be increased as compared to FDMA.

In TDMA, however, since segmented signals are time-divisionally exchanged between the base station and the mobile stations, the amount of information of communication by one mobile station becomes small. To increase the amount of information of communication, current digital portable telephones and the like transmit signals compressed by encoding. On the receiving side, the signal is expanded and reproduced. For this reason, the quality of reproduced speech degrades.

In recent years, CDMA (Code Division Multiple Access) using direct spread spectrum has received a great deal of attention as a communication scheme capable of greatly increasing the utilization efficiency of each frequency band and also reproducing high-quality speech.

In CDMA, signals to be transmitted from a base station to mobile stations are spread using spreading codes unique to the respective mobile stations, and transmitted using one frequency band. A receiving-side mobile station multiplies received signals by the specific spreading code assigned to the mobile station, to calculate correlation between it and each spreading code used on the transmitting side. The mobile station thereby detects the peak value of correlation, and extracts only a signal addressed to the mobile station. According to CDMA, one frequency band can be assigned to a larger number of mobile stations by using different spreading codes. In addition, since the amount of information to be transmitted can be increased, the quality of reproduced speech can also be improved.

When a mobile station such as a portable telephone is powered on, it must receive a predetermined message from the base station in the area (cell). In CDMA, the message from the base station is repeatedly sent in units of predetermined slots, as shown in FIG. 1. As indicated by an arrow in FIG. 1, the mobile station is not always powered on at the start timing of a slot and cannot correctly read the message when it is powered on at another timing.

To decode properly the message contained in the slot, the start timing of the slot must be detected (this is called "cell search"), and the message must be received from that timing. Cell search is not limited to the above-described initial cell search for catching the cell to be connected at the time of powering the mobile station on. More specifically, even after powering on, for example, when the mobile station moves across cells, synchronization may shift. Hence, synchronization shift is always monitored by periodically performing cell search.

FIG. 2 is a block diagram showing the construction of a cell search circuit of conventional wideband CDMA communication scheme (direct spread CDMA), which is provided in a mobile station. Referring to FIG. 2, for a reception signal (transmission channel signal as shown in FIG. 1, which is transmitted from a base station (not shown)), the first 1-bit data of each slot, which is indicated by a hatched portion in FIG. 1, is spread by a common spreading code (a spreading code that changes 256 times in one bit: number of chips=256) prepared independently of the spreading codes unique to the respective mobile stations. Normally, such a transmission channel signal for cell search is transmitted using a common channel (perch channel).

The in-phase component I and the quadrature component Q of the voltage of such a reception signal are converted into digital signals by an A/D converter 101 and sequentially supplied to a correlator 102 such as a matched filter or a sliding correlator, in units of slots (one slot corresponds to 10 symbols) from the power-on timing of the mobile station. The correlator 102 integrates each digital signal input from the A/D converter 101 with the spreading code common to the mobile stations, which is generated by a code generator 103, so as to perform despreading.

The in-phase component I and the quadrature component Q of the voltage, which are output from the correlator 102, are supplied to a power conversion section 104 and converted into power values in units of predetermined sampling points in the slot. The power values obtained at the sampling points are sequentially stored at addresses of a memory (RAM) 107 corresponding to the respective sampling points, through an adder 106 in a power value integration section 105.

In the above process, only the portion with large correlation with the common spreading code multiplied by the mobile station in the first slot after powering the mobile station, i.e., only the power value of the hatched portion in FIG. 1 where the common spreading code is multiplied by the base station (not shown) appears as a peak. Hence, when this peak portion is detected, the start position of the slot can be confirmed, and subsequent communication can be performed in accordance with that timing.

In fact, a mobile station receives transmission channel signals with delays from two or more base stations near the mobile station, as shown in FIG. 1. In addition, signals from one base station include not only direct waves directly received from the base station but also waves reflected by buildings or the ground and then received. For this reason, a received transmission channel signal has, in one slot, a number of portions spread by the common code, and a number of peak power values are detected in one slot. Besides, when the mobile station moves in the cell search operation, the peak in the next slot may be detected at a position different from the previous position.

In consideration of these situations, the peak power value is detected not for only the first slot after powering the mobile station but over several slots. More specifically, the power integration values up to the preceding slot are read out from the RAM 107 in units of sampling points and supplied to the adder 106. The power values at the same sampling point in the current slot are added and stored in the RAM 107 again. By integrating the power values over several slots, the portion with the largest peak is finally recognized as the start portion of the transmission channel signal sent from the closest base station.

The number of times of integration of the power values (slot count) is set in an integration count setting register 108. A counter 109 increments the count value by one, every time integration of one slot is ended. When the count value reaches a value set in the integration count setting register 108, the counter 109 outputs a time-out signal, and integration is ended.

However, when cell search is performed using the above conventional method, the RAM 107 for storing the power integration value at each sampling point requires the capacity of 10,240 words. That is, the number of chips (the number of cycles) in one slot of the perch channel for cell search is 256×10=2560. To increase the accuracy of peak value detection, one chip is divided into four divisions, and oversampling of 4 times is performed. Hence, the total number of sampling points in one slot is 10,240 (when the chip rate is 4 Mcps).

The area of the RAM 107 for storing power integration values corresponding to 10,240 words is several mm square or more. This causes a very large circuit area. In particular, for a portable communication terminal such as a portable telephone, it is important to make it compact and lightweight. Circuits for transmission, reception, and cell search functions need be stored in one chip. However, since the ratio of the cell search circuit to the LSI becomes very high, the LSI itself cannot be made compact.

In addition, since data having the largest value must be selected from 10,240 power integration values stored in the RAM 107, the processing load is heavy, and it takes a long time to complete cell search. For example, a long time is required for initial cell search upon powering on, and the rise time until communication is enabled, becomes very long.

In cell search using the above conventional method, the number of times of integration of power values is set to be relatively large (e.g., for 32 slots) in consideration of a bad reception sensitivity state such that the path having the peak can be extracted even when the signal reception sensitivity is low. For this reason, the time required for cell search is constant independently of the signal reception state. Even when the reception state is good, integration is performed a number of times more than necessity, and it takes a long time to complete cell search.

SUMMARY OF THE INVENTION

It is an object of the present invention to decrease the capacity of the RAM used for cell search to make the cell search circuit compact and increase the speed of the cell search operation.

It is another object of the present invention to shorten the cell search time in accordance with the signal reception state.

It is another object of the present invention to reduce the circuit area of the RAM used for cell search to realize a more compact mobile communication terminal.

In a cell search method according to an aspect of the present invention, a station detects a correlation value between an input signal and a spreading code generated by the station itself, and detects a correlation peak value in a predetermined unit of slots, and a threshold value is provided to be compared with the detected correlation value.

A correlation value exceeding the threshold value may be stored in a memory. In addition, timing data on the timing when the correlation value exceeds the threshold value may be stored in a memory simultaneously with the storage of the correlation value.

In this feature of the present invention, in the correlation values obtained in a slot, the correlation values exceeding the threshold value are registered in the memory, and the correlation values not exceeding the threshold value are neglected as noise data. The unnecessary correlation values at noise levels are not stored in the memory. For this reason, as compared to the prior art in which all detected correlation values are stored in a memory, the number of correlation values actually stored in the memory can be decreased.

Hence, the necessary storage capacity of the memory can be greatly decreased, and so the physical circuit area of the memory can be considerably reduced. In addition, load in the process of searching for the largest value from the correlation values stored in the memory can be reduced, and so the correlation peak value can be detected at a higher speed. In a portable telephone of, e.g., wideband CDMA scheme, high-speed cell search and size reduction of the circuit therefor can be realized.

In a cell search method according to another aspect of the present invention, a station detects, each slot in a predetermined unit, a correlation value between an input signal and a spreading code generated by the station itself, the detection process for correlation value is performed over several slots, the correlation values obtained in the slots are integrated to detect a correlation peak value, and the integration process is ended when the number of paths at which an integrated correlation value has reached a reference set value, reaches a path count set value.

In this feature of the present invention, the integrated correlation value calculated in integration in each slot is compared with the reference set value. The number of integrated correlation values that have reached the reference set value is counted. When the count value has reached the path count set value in a slot, the integration operation is then ended, and processing shifts to the next phase. When the signal reception sensitivity is good, an integrated correlation value reaches the reference set value at an early stage, and the path count value also reaches the path count set value at an early stage. For this reason, the integration time can be shortened.

Hence, a high-speed cell search operation can be realized, and power consumption can be reduced accordingly. In a portable telephone of, e.g., wideband CDMA scheme, high-speed cell search and reduction of power consumption therefor can be realized.

In a communication synchronization apparatus according to another aspect of the present invention for performing a cell search operation in which a station detects a correlation value between an input signal and a spreading code generated by the station itself, and detects a correlation peak value in a predetermined unit of slots, a dynamic RAM is used as a memory used in the cell search operation.

For example, the dynamic RAM is used as a memory for storing integration results in the cell search operation.

Data access occurs in the dynamic RAM within its refresh cycle.

In this feature of the present invention, the memory which is conventionally constructed by a static RAM (SRAM) is replaced with the dynamic RAM (DRAM), and the memory structure is simplified. In the DRAM used in the present invention, data access occurs within its refresh cycle. For this reason, no refresh operation need be performed, and the control construction for refreshing is not required.

Hence, the scales of the memory itself and the peripheral circuits can be made considerably small. Even in case of a portable terminal apparatus of, e.g., wideband CDMA scheme that requires a relatively large memory capacity, the apparatus can be made compact.

DETAILED DESCRIPTION OF THE PREFERRED EMBODIMENTS

Hereinafter, embodiments of the present invention will be described with reference to the accompanying drawings.

Figure 3:
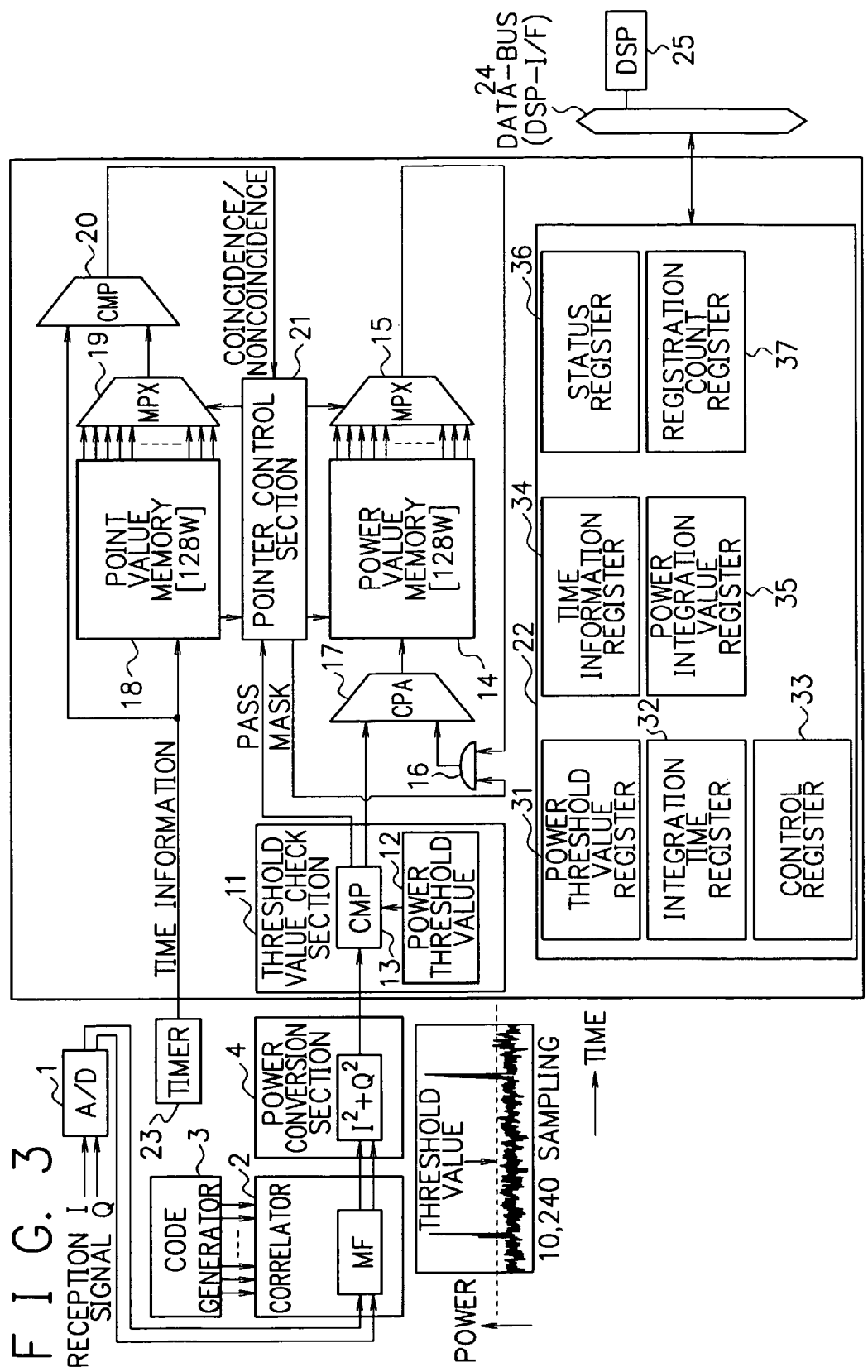
FIG. 3 is a block diagram showing the construction of a cell search circuit according to the first embodiment of the present invention.

FIG. 3 is a block diagram showing the construction of a cell search circuit according to the first embodiment of the present invention.

Figure 1:
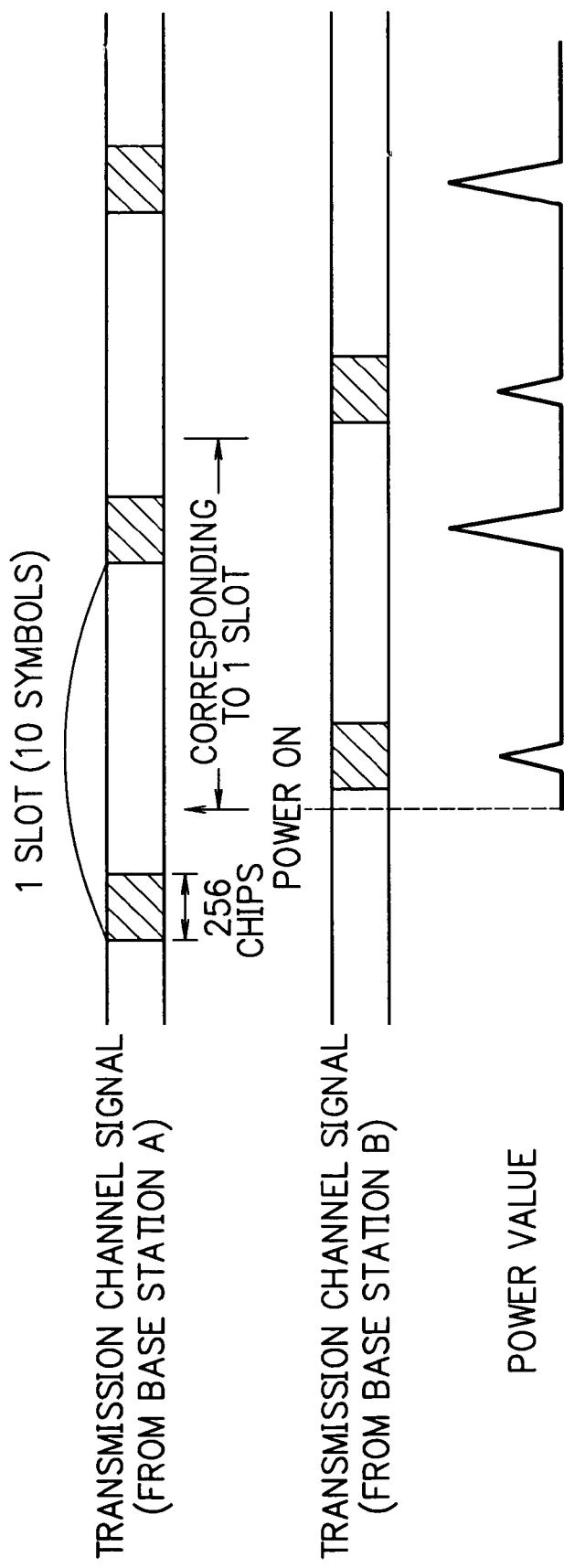
FIG. 1 is a chart for illustrating cell search operation.

A reception signal (external input signal) shown in FIG. 3 is a transmission channel signal as shown in FIG. 1, which is transmitted from a base station (not shown). The first bit of each slot, which is indicated by a hatched portion in FIG. 1, is spread by a spreading code (the number of chips=256) common to all mobile stations. The in-phase component I and the quadrature component Q of the voltage of this reception signal are limited to the frequency band of the signal sent from the base station through a bandpass filter (not shown) and supplied to an A/D converter 1.

The A/D converter 1 converts the above-described reception signal to a digital signal. A correlator 2 sequentially calculates integration between digital signals input from the A/D converter 1 and the spreading code common to the mobile stations, which is generated by a code generator 3, in units of slots from the ON timing of a mobile station to perform despreading, so as to detect the correlation between its own spreading code of the mobile station and the reception signal. The correlator 2 is constructed by, e.g., a matched filter or sliding correlator.

A power conversion section 4 calculates the square-sum of the in-phase component I and the quadrature component Q of the voltage output from the correlator 2 for each of 10,240 sampling points set in advance in a slot to obtain the power value of correlation. A power value integration section 5 integrates, in units of sampling points, the power value output from the power conversion section 4 at each sampling point for several slots.

Figure 2:
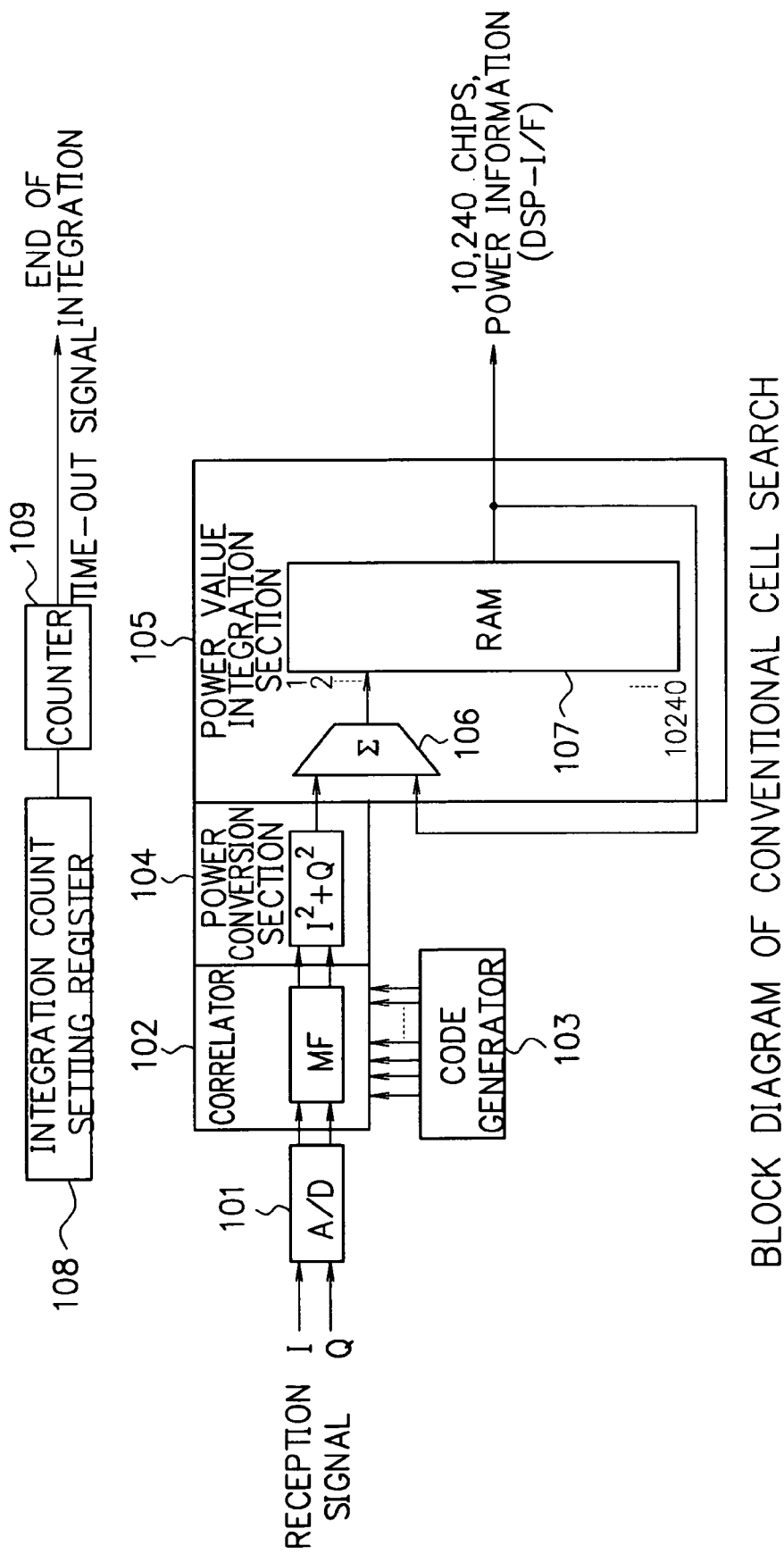
FIG. 2 is a block diagram showing the construction of a conventional cell search circuit.

The A/D converter 1, the correlator 2, the code generator 3, and the power conversion section 4 are the same as the conventional A/D converter 101, the correlator 102, the code generator 103, and the power conversion section 104 shown in FIG. 2. The power value integration section 5 is a characteristic feature of the present invention. The power value integration section 5 will be described below in detail.

In a threshold value check section 11, a comparator 13 compares the power value output from the power conversion section 4 with a predetermined power threshold value 12 in units of sampling points. The active/negative state of a pass signal is controlled in accordance with the relationship in magnitude between the given power value and the threshold value. A power value memory (RAM) 14 stores the power value output from the comparator 13 in the threshold value check section 11. A multiplexer 15 selects and reads out one of the power values at the sampling points, which are stored at addresses in the power value memory 14, and supplies the power value to one input terminal of an AND gate 16.

A carry propagation adder 17 adds the data value output from the AND gate 16 to the power value output from the comparator 13 in the threshold value check section 11 and stores the result in the power value up memory 14. For example, when a power integration value to the preceding slot at a given sampling point, which is read out from the power value memory 14 through the multiplexer 15, passes through the AND gate 16, the power integration value is added to the power value at the same sampling point in the current slot by the carry propagation adder 17, and the sum is stored in the power value memory 14 at the same address.

When "0" data is output from the AND gate 16 by a mask signal (to be described later), the power value at a certain sampling point in the current slot, which is output from the comparator 13 in the threshold value check section 11, directly passes through the carry propagation adder 17 and is stored at a new address in the power value memory 14.

A point value memory (RAM) 18 stores the value of the sampling point corresponding to the power value stored in the power value memory 14, i.e., timing information such as the relative time (relative cycle count) from the slot head in one slot, which is measured by a timer 23 in units of slots. A multiplexer 19 selects and reads out one of the sampling point values stored at addresses in the point value memory 18 and supplies the sampling point value to one input terminal of a comparator 20.

Relative time information (the current sampling point value in the current slot) from the slot head, which is measured by the timer 23, is input to the other input terminal of the comparator 20. The comparator 20 compares the current sampling point value with the sampling point value read out from the point value memory 18 through the multiplexer 19 and supplies a signal representing whether both values coincide with each other to a pointer control section 21.

The pointer control section 21 controls the pointer (address) of read/write of data in the power value memory 14 and the point value memory 18 in accordance with pass signal supplied from the comparator 13 in the threshold value check section 11 and the coincidence/non-coincidence signal supplied from the comparator 20. When a non-coincidence signal is supplied from the comparator 20, the pointer control section 21 supplies a mask signal to the other input terminal of the AND gate 16. In this case, the power value output from the comparator 13 directly passes through the carry propagation adder 17 and is stored at a new address in the power value memory 14, as described above.

A register group 22 provides various functions for the cell search operation of this embodiment. Details thereof will be described later. The timer 23 counts the relative time (relative cycle count) from the slot head in one slot in units of slots. In this embodiment, for example, the count operation is started at the start of reception by powering the mobile station. When the count value has reached 10,239, it is reset to 0 again.

The operation of the power value integration section 5 having the above construction will be described below. First, the operation for the first slot immediately after powering on the mobile station will be described. The power value at each sampling point, which is output from the power conversion section 4, is compared with the predetermined power threshold value 12 in the threshold value check section 11. When the power value is larger than the threshold value (or equal to or larger than the threshold value), the pass signal becomes active. When the power value is equal to or smaller than the threshold value (or smaller than the threshold value), the pass signal remains negative.

Only when the pass signal is active, the power values obtained at that time are stored in the power value memory 14 through the carry propagation adder 17 sequentially from the upper address. Simultaneously with storage of power values, sampling point values corresponding to power values larger than the power threshold value 12 are stored in the point value memory 18 sequentially from the upper address. The two memories 14 and 18 sequentially store power values larger than the power threshold value 12 and sampling point values corresponding to the power values sequentially at identical addresses.

In the first slot for integration, power values larger than the power threshold value 12 and sampling point values corresponding to the power values are unconditionally registered in the two memories 14 and 18. For the second and subsequent slots, the threshold value comparison is the same as in the first slot. However, the operation performed when the power value exceeds the power threshold value 12 is different from that for the first slot. When the power value does not exceed the power threshold value 12, and the pass signal remains negative, no process is performed at that sampling point, as in the first slot.

For the second and subsequent slots, when the power value exceeds the power threshold value 12, search is performed using the multiplexer 19 and comparator 20 to check whether the sampling point value corresponding to the power value has already been stored in the point value memory 18. If it reveals that the sampling point value has already been stored in the point value memory 18 by processing to the preceding slot, the pointer control section 21 controls such that the power value integration section 5 operates as follows.

Of power integration values up to the preceding slot, which are stored in the power value memory 14, a power integration value at an address identical to that on the point value memory 18 where the sampling point is stored is read out through the multiplexer 15 and supplied to the carry propagation adder 17 through the AND gate 16. The carry propagation adder 17 adds the readout power integration value to the preceding slot to the current power value supplied from the comparator 13. The sum result is stored at the same address in the power value memory 14.

For the second and subsequent slots, when the power value exceeds the power threshold value 12, and the sampling point corresponding to the power value has not been registered in the point value memory 18 by processing to the preceding slot, the new sampling point value is stored at a new address in the point value memory 18. In addition, a mask signal is output from the pointer control section 21 to store the power value output from the comparator 13 at a new address in the power value memory 14 through the carry propagation adder 17.

When such power value integration processing is performed for several slots, the integration result of power values larger than the power threshold value 12 and sampling point values corresponding to the power integration values are stored in the power value memory 14 and the point value memory 18 sequentially from the upper addresses by processing in each slot. After that, a DSP (Digital Signal Processor) 25 connected to the power value integration section 5 through a data bus 24 selects the largest power integration value from at one power integration value stored in the power value memory 14. This makes it possible to recognize that the sampling point value corresponding to the power integration value corresponds to the slot head portion of the transmission channel signal sent from the closest base station.

As described above, according to the cell search scheme of this embodiment, the power threshold value 12 is set in advance. When data values converted into power values using a spreading code are to be stored in the memory (RAM), only data values exceeding the threshold value are stored, and data values equal to or smaller than the threshold value are not stored. Since unnecessary data values of noise level are not stored in the memory, the number of words necessary as the storage capacity of the memory can be made much smaller than that of the prior art.

For example, to detect 20 waves of integrated relative power values in descending order, the memory requires a capacity corresponding to at least 20 words. Even when it is assumed that about 80 waves (=20 waves×4 multipaths) of power peak values are detected in one slot assuming that direct waves and reflected waves from the closest base station, waves from another base station, or other interference waves are received by one mobile station, the power value memory 14 and point value memory 18 only need have storage capacities corresponding to at least the number of words. In the example shown in FIG. 3, each memory has a storage capacity of 128 words with some margin. The storage capacity is much smaller than the conventional storage capacity of 10,240 words.

As described above, in this embodiment, since the number of words necessary as the storage capacity of a RAM can be largely decreased, the circuit area of the RAM can be made much smaller than the prior art.

In addition, in processing of searching for data having the largest value from power integration values stored in the RAM, the data is selected from 128 power integration values at maximum. For this reason, the processing load can be reduced, and the maximum power peak value can be detected at a higher speed.

The register group 22 shown in FIG. 3 will be described next. A power threshold value register 31 is used to set arbitrarily the power threshold value 12 to be compared by the comparator 13 in the threshold value check section 11. A threshold value of user's choice can be freely selected by rewriting the contents in the power threshold value register 31. For example, when a portable terminal having the cell search circuit of this embodiment is used in a city where the density of buildings is high, the number of peaks in one slot is expected to increase. In this case, overflow of the memory can be prevented by setting a large power threshold value 12. When the power threshold value 12 is made larger or smaller in accordance with the registration situation of the correlation power value in the first slot, despreading can be performed in accordance with the wave reception state.

An integration time register 32 is used to set arbitrarily the power value integration time in cell search, i.e., the number of slots to be integrated. An integration time of user's choice can be freely selected by rewriting the contents of the integration time register 32. For example, in a city where the density of buildings is high, the number of peaks in one slot is expected to increase. In this case, accurate cell search can be executed by setting a large number of slots to be integrated. When the portable terminal is used in a rural area where a smaller number of reflected waves and interference waves are present, high-speed cell search can be executed by setting a small number of slots.

A control register 33 is used to start the cell search operation or clear the pointers of the memories 14 and 18 to interrupt the cell search operation. More specifically, the control register 33 has an area where a start bit is prepared. When "1" is written in this area, the cell search operation starts. The relative time in one slot is counted by the timer 23 from this start timing. The control register 33 has another area where a reset bit is prepared. When "1" is written in this area, only the pointers of the memories 14 and 18 are cleared. The control register 33 is provided for guarantee for abnormal operations in testing before delivery of products.

A time information register 34 is used to read out time information (sampling point value) stored in the point value memory 18 onto the data bus 24. More specifically, when this time information register 34 is read, the time information stored in the point value memory 18 is sequentially read out by incrementing it by one, and output through the data bus 24.

The time information register 34 is used, e.g., to detect, by the cell search operation, the maximum value from the power integration values stored in the power value memory 14 and grasp a sampling point value corresponding to the maximum power integration value. The time information register 34 can also be used to read out all time information in the point value memory 18 to verify the number of peaks at a certain time in testing before delivery of products.

A power integration value register 35 is used to read out the power integration value stored in the power value memory 14 onto the data bus 24 as the result of cell search. More specifically, when this power integration value register 35 is read, the power integration value stored in the power value memory 14 is sequentially read out by incrementing it by one, and output through the data bus 24. The power integration value register 35 is used, e.g., to detect, by the cell search operation, the maximum value from the power integration values stored in the power value memory 14.

A status register 36 is used to notify, through the data bus 24, the DSP 25 whether the cell search operation is completed or the power value memory 14 and point value memory 18 have overflowed during the cell search operation because too many power values exceed the power threshold value 12. The user can know the state of cell search operation by causing a display section (not shown) to display the contents of the status register 36 of which the DSP 25 is notified. For example, when this status register 36 is used in testing before delivery of products, the default value of the power threshold value 12 or the number of words to be prepared as the storage capacity of each of the power value memory 14 and point value memory 18 can be verified.

A registration count register 37 is used to notify the DSP 25 of the number of words corresponding to power integration values and sampling point values corresponding to the power integration values, which are registered in the power value memory 14 and point value memory 18, respectively, as a result of cell search. For example, when it is confirmed on the basis of the contents of the status register 36 that cell search is completed, the contents of the registration count register 37 are referred to next to know the number of words actually registered. In this case, the maximum peak value can be detected by reading out power integration values corresponding to at least the number of words from the power integration value register 35, and the cell search processing time can be shortened.

Figure 4:
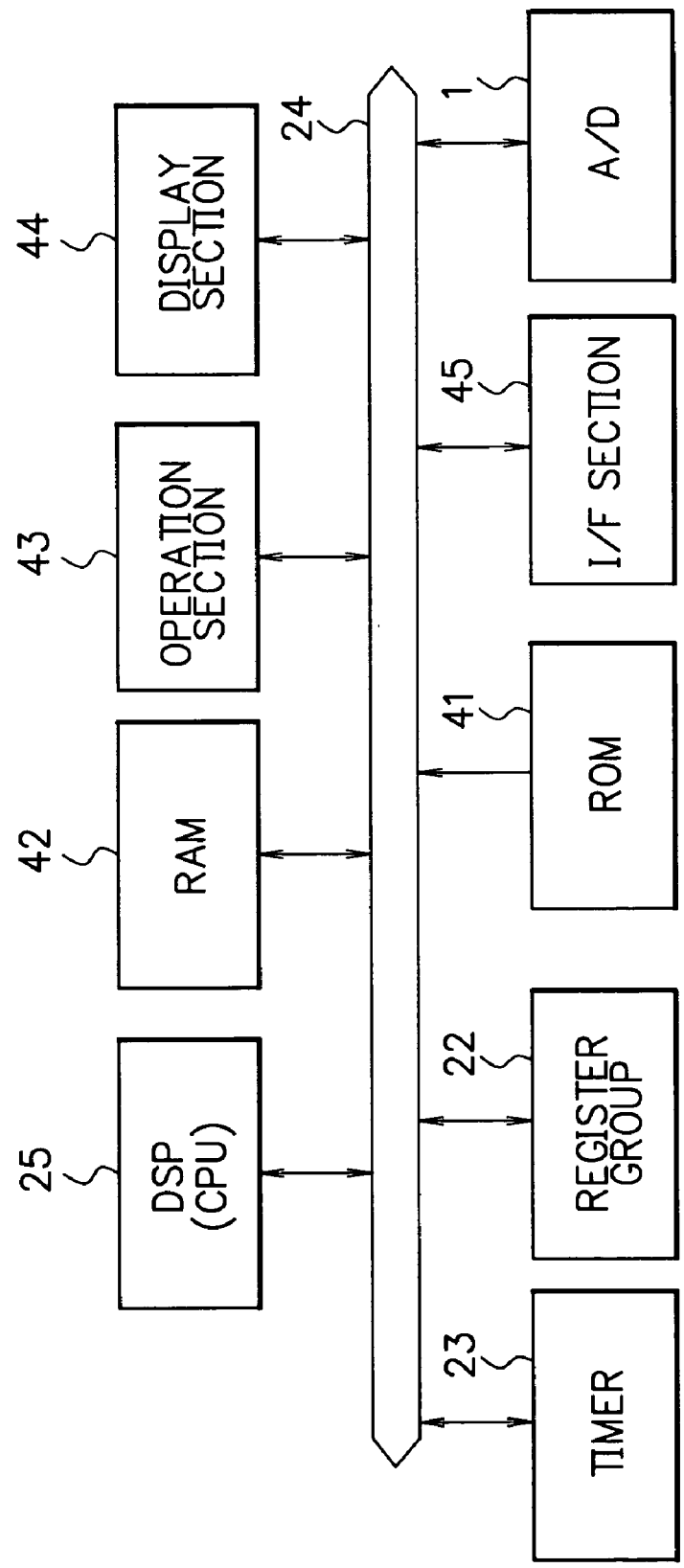
FIG. 4 is a block diagram showing an example of construction for realizing a cell search method according to the first embodiment by software.

As described above, the cell search method of this embodiment is realized by the circuit construction shown in FIG. 3. However, it can also be realized by operating a program stored in the RAM or ROM of a computer. FIG. 4 is a block diagram showing an example of construction for realizing the cell search method described with reference to FIG. 3 by software. The same reference numerals as in FIG. 3 denote the same blocks in FIG. 4.

Referring to FIG. 4, a ROM 41 is a read-only memory that stores a program for executing the cell search operation of this embodiment and a variety of necessary data. A RAM 42 is a random access memory for temporarily storing various data obtained in the process of cell search operation based on the program or storing data finally obtained by cell search. The RAM 42 includes the power value memory 14 and point value memory 18 shown in FIG. 3. The RAM 42 may store the program.

An operation section 43 is used by the user to perform operations necessary for speech communication using the portable terminal or set desired values in the registers 31 to 37 provided in the register group 22 shown in FIG. 3. A display section 44 displays various set contents in the register group 22 or various messages.

The DSP (CPU) 25 serving as a control section mainly executes the operations of the correlator 2, the power conversion section 4, and the power value integration section 5 shown in FIG. 3 or a process of detecting the maximum value from power integration values stored in the RAM 42 by cell search to find the slot head portion in accordance with the program stored in the ROM 41 or the RAM 42. In this case, the DSP 25 also performs the operations of the correlator 2 and the power conversion section 4. However, the correlator 2 and the power conversion section 4 may be provided independently of the DSP 25 and execute the operations.

An I/F section 45 performs a process of receiving a signal received by a reception section (not shown) or sending various signals to a transmission section (not shown). The I/F section 45 is also used to load the program with which the DSP 25 operates to provide the cell search function. For example, the program for realizing the cell search method of this embodiment is recorded on a recording medium such as a CD-ROM and supplied to the RAM 42 or a hard disk (not shown) through the I/F section 45. As the recording medium to which the program is supplied, not only a CD-ROM but also a floppy disk, a hard disk, a magnetic tape, an optical magnetic disk, or a nonvolatile memory card can be used.

Figure 5:
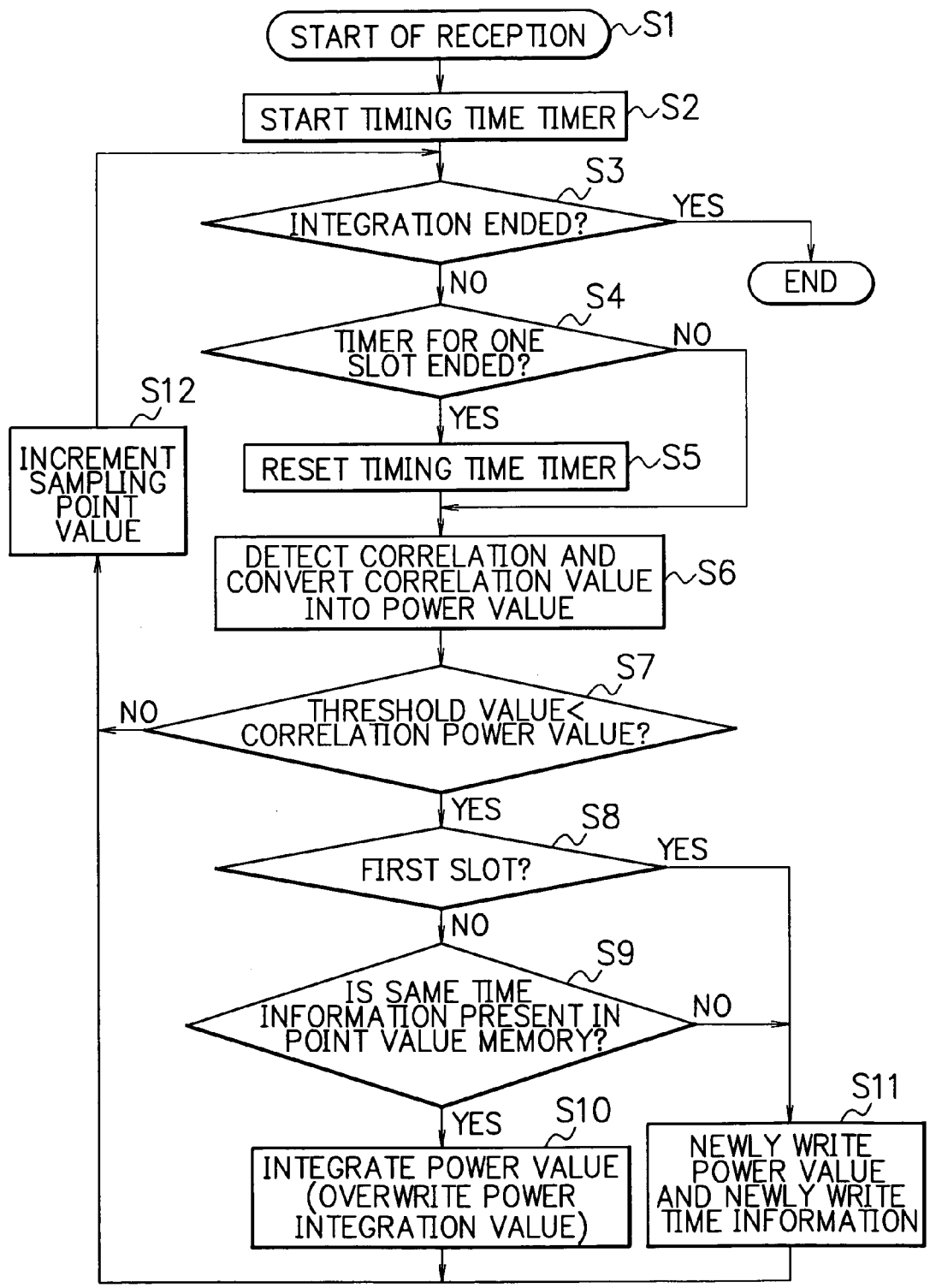
FIG. 5 is a flow chart of the cell search method according to the first embodiment.

FIG. 5 is a flow chart for explaining operation of executing cell search by software processing.

Referring to FIG. 5, when reception of a transmission channel signal from the base station is started in step S1, the timer 23 for counting the relative time (relative cycle count) from the slot head in each slot is started in step S2, and the flow advances to step S3.

It is determined in step S3 whether integration is completed, i.e., integration is performed for a predetermined number of slots. If YES in step S3, the cell search operation is ended. If slots still remain, the flow advances to step S4 to determine whether counting for one slot by the timer 23 is ended. If YES in step S4, the timer 23 is reset in step S5, and the flow advances to step S6. If NO in step S4, the flow advances to step S6 without processing.

In step S6, for a sampling point to be currently processed, correlation between its own spreading code of the mobile station and the reception signal is detected, and at the same time the detected correlation value is converted into a power value. In step S7, it is determined whether the correlation value converted into a power value (correlation power value) is larger than a predetermined threshold value. If YES in step S7, the flow advances to step S8 further to determine whether the slot currently under integration is the first slot after the start of reception.

If YES in step S8, the flow advances to step S11 to write the correlation power value obtained in step S6 at a new address in the RAM 42 (corresponding to the power value memory 14 shown in FIG. 3) and also to write the corresponding piece of time information counted by the timer 23 (relative time from the slot head) at a new address in the RAM 42 (corresponding to the point value memory 18 shown in FIG. 3). The sampling point is incremented by one in step S12. The flow then returns to step S3 to perform the same process as described above for the next sampling point.

If the slot currently under integration is not the first slot, i.e., the second or subsequent slot, the flow advances from step S8 to S9 to determine whether the same time information as that of the current sampling point has already been stored in the RAM 42 (point value memory 18). If YES in step S9, the flow advances to step S10 to read out the power integration value corresponding to the time information (sampling point value) from the RAM 42. The obtained power value is added to the power integration value to perform integration. The integration result is stored at the same address in the RAM 42.

If NO in step S10, the flow advances to step S11 to write the newly obtained correlation power value at a new address in the RAM 42 (power value memory 14) and write corresponding time information at a new address in the RAM 42 (point value memory 18). When processing in step S10 or S11 is ended, the sampling point is incremented by one in step S12, and the flow returns to step S3 to perform the same process as described above for the next sampling point.

The operation performed when the correlation power value at a certain sampling point is larger than the predetermined threshold value has been described above. When it is determined in step S7 that the correlation power value is equal to or smaller than the threshold value, the flow returns to step S3 through step S12 without processing in steps S8 to S11, and processing for the next sampling point is performed. In this embodiment, only when the obtained correlation power value is larger than the threshold value, it is stored in the RAM 42. Otherwise, the correlation power value is not stored in the RAM 42.

With this construction, the storage capacity of the RAM 42 can be largely decreased as compared to the prior art, and the circuit area of the RAM 42 can be made very small. For processing by the DSP 25 for searching for the maximum value from power integration values stored in the RAM 42, the processing load can be decreased, and the cell search operation can be performed at a higher speed.

In the first embodiment, two pieces of voltage information, i.e., the in-phase component I and quadrature component Q obtained by the correlator 2 are converted into a power value, and the correlation value converted into the power value is integrated. However, the integration operation may be performed for each of the two correlation values, i.e., the in-phase component I and the quadrature component Q. In this case, two threshold values are prepared for the in-phase component I and the quadrature component Q, respectively.

In the first embodiment, to integrate power values for several slots, power values exceeding the threshold value are stored in the memory. When the transmission channel signal from the base station is sent using higher power, the slot head can be detected only by detecting the peak power value in the range of the first slot, and integration need not be performed. Hence, when a power value larger than the threshold value is detected, and a larger value is left, power values need not be stored.

In the embodiment shown in FIG. 3, the power value memory 14 and the point value memory 18 are separately provided. However, both a correlation power value and time information corresponding to the power value may be stored in one RAM. For example, when a correlation power value and time information corresponding to the power value are stored in one word, pointer control by the pointer control section 21 can be simplified.

In the embodiment shown in FIG. 3, the output signal from the multiplexer 15 and the mask signal are input to the input terminals of the AND gate 16. The mask signal is output when a non-coincidence signal is supplied from the comparator 20 to the pointer control section 21. However, the output signal from the comparator 13 and the mask signal may be input to the input terminals of the AND gate 16, and the mask signal may be output when the pass signal is negative (when the detected correlation power value does not exceed the power threshold value 12).

In this case, when the obtained correlation power value does not exceed the threshold value, and the pass signal is negative, the output signal from the multiplexer 15 and "0" data from the AND gate 16 are input to the carry propagation adder 17. For this reason, the contents stored in the power value memory 14 are kept unchanged. When the obtained correlation power value exceeds the threshold value, and the pass signal is active, the correlation power value output from the comparator 13 is input to one input terminal of the carry propagation adder 17 through the AND gate 16.

At this time, when an existing power integration value is read out from the power value memory 14 to the other input terminal of the carry propagation adder 17 by the multiplexer 15, the value is added to the obtained correlation power value output from the comparator 13 and stored at the same address. On the other hand, when the correlation power value at the same sampling point is not stored by processing to the preceding slot, and a new address is designated as an area where the correlation power value is to be stored, the correlation power value output from the comparator 13 is directly stored at a new address in the power value memory 14 through the carry propagation adder 17.

In the embodiment shown in FIG. 5, it is determined in step S8 whether the current slot is the first slot or the second or subsequent slot, and processing branches depending on the determination result. Even when the same process as that for the second and subsequent slots is performed for the first slot, the same result is obtained. For this reason, processing in step S8 is not always necessary.

The second embodiment of the present invention will be described next with reference to the accompanying drawings.

Figure 6:
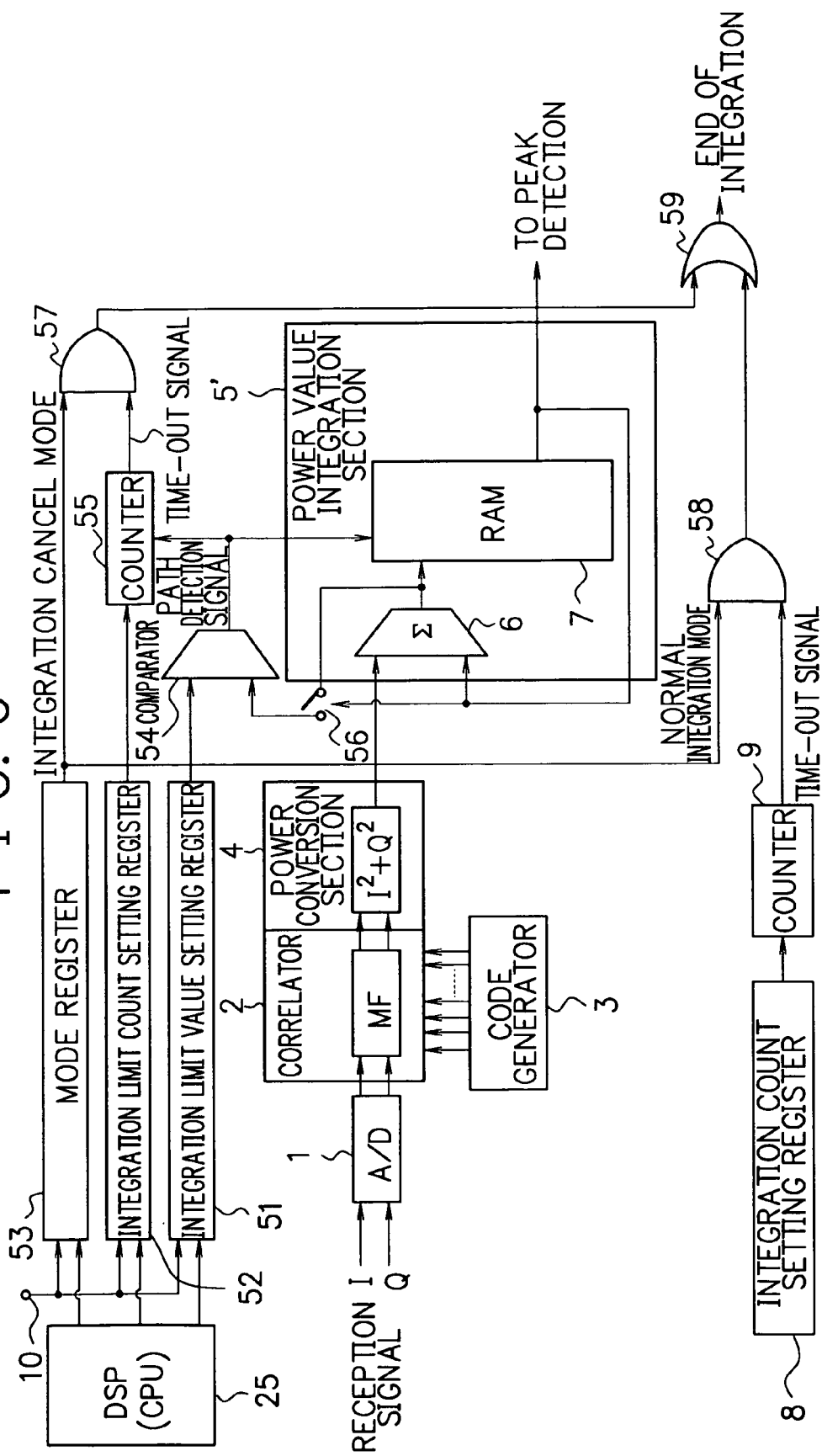
FIG. 6 is a block diagram showing the construction of a cell search circuit according to the second embodiment of the present invention.

FIG. 6 is a block diagram showing the construction of a cell search circuit according to the second embodiment. The same reference numerals as in FIG. 3 denote the same blocks in FIG. 6.

The in-phase component I and the quadrature component Q of the voltage of a reception signal shown in FIG. 1, which is transmitted from a base station (not shown), are limited to the frequency band of the signal sent from the base station through a bandpass filter (not shown) and supplied to an A/D converter 1.

The A/D converter 1 converts the above-described reception signal to a digital signal. A correlator 2 sequentially calculates integration between digital signals input from the A/D converter 1 and the spreading code common to the mobile stations, which is generated by a code generator 3, in units of slots from the ON timing of a mobile station to perform despreading, so as to detect the correlation between its own spreading code of the mobile station and the reception signal.

A power conversion section 4 calculates the square-sum of the in-phase component I and the quadrature component Q of the voltage output from the correlator 2 for each of 10,240 sampling points set in advance in a slot to obtain the power value of correlation. A power value integration section 5' integrates, in units of sampling points, the power value output from the power conversion section 4 at each sampling point for several slots.

The power value integration section 5' has a RAM 7 for storing power integration values (integration correlation values) to the preceding slot, and an adder 6 for adding the power integration values up to the preceding slot which are stored in the RAM 7 and the power values in the current slot supplied from the power conversion section 4 at the corresponding sampling points. Power values are integrated using the adder 6 and RAM 7. The RAM 7 of this embodiment stores not only a power integration value for each of the 10,240 sampling points but also a control signal (to be described later) in units of sampling points.

An integration count setting register 8 is used to set the number of times (the number of slots) of integration of power values in the normal integration mode (to be described later). A first counter 9 counts the number of times of integration of power values. Every time integration for one slot is ended, the count value is incremented by one. When the count value reaches the count set in the integration count setting register 8, a time-out signal is output.

An integration limit value setting register 51 is used to set the power threshold value (corresponding to the reference set value in the present invention) to be compared with the power values integrated in units of sampling points. The power threshold value is set at a value necessary and sufficient for detecting the peak from the integrated power values at the sampling points.

An integration limit count setting register 52 is used to set a path count threshold value (corresponding to the path count set value in the present invention) to be compared with the number of paths where the calculated power integration value has reached the power threshold value. In recognizing the head portion of a slot, smaller values of the 10,240 power integration values stored in the RAM 7 are unnecessary. Hence, a value necessary and sufficient for slot header portion recognition processing is set as the path threshold value.

A mode register 53 is used to set selectively one of the normal integration mode that is the same as the conventional integration scheme and an integration cancel mode unique to this embodiment.

A comparator 54 compares, in units of sampling points, the power integration value output from the adder 6 in the power value integration section 5' with the power threshold value set in advance in the integration limit value setting register 51. When the power integration value is larger than the power threshold value, a path detection signal is output. A second counter 55 counts the number of paths where the power integration value has reached the power threshold value. The count value is incremented by one every time a path detection signal is supplied from the comparator 54. When the count value reaches the number of paths set in advance in the integration limit count setting register 52, a time-out signal is output.

A switch circuit 56 is opened/closed in accordance with a control signal read out from the RAM 7 in units of sampling points so as to prevent a path that is counted once by the second counter 55 from being counted again. In the initial state before the start of integration, the switch circuit 56 is closed, and the output from the adder 6 is supplied to the comparator 54. Unless the power integration value calculated for each slot reaches the power threshold value, the control signal at a position corresponding to the sampling point in the RAM 7 is maintained in the initial state, and the switch circuit 56 is closed accordingly.

After several slots from the start of integration, when the power integration value calculated at a given sampling point (path) reaches the power threshold value, the state of a control signal in the RAM 7 at a position corresponding to the detected path is changed in accordance with the state of the path detection signal output from the comparator 54. In processing subsequent slots, even when the power integration value of the path (the power integration value exceeds the power threshold value) is output from the adder 6, the switch circuit 56 is opened in accordance with a corresponding control signal to prevent the output power integration value from being supplied to the comparator 54. This prevents the same path from being repeatedly counted by the second counter 55.

One AND circuit 57 calculates the AND between the integration cancel mode setting signal and the time-out signal output from the second counter 55 and outputs the result to an OR circuit 59. The other AND circuit 58 calculates the AND between the normal integration mode setting signal and the time-out signal output from the first counter 9 and outputs the result to the OR circuit 59. The OR circuit 59 calculates the OR between the two AND circuits 57 and 58 and outputs the result as an integration end signal.

More specifically, when the normal integration mode is set, and the time-out signal is output from the first counter 9 as the result of integration performed a predetermined number of times, an integration end signal is output through the AND circuit 58 and the OR circuit 59, and the integration operation is ended. On the other hand, when the integration cancel mode is set, the time-out signal is output from the second counter 55 as the result that the number of paths where the power integration value has reached the power threshold value has reached the predetermined number of paths. The integration end signal is output through the AND circuit 57 and the OR circuit 59 accordingly, and the integration operation is canceled.

The operation of the cell search circuit having the above construction will be described below. First, an operation in which the integration operation is not canceled will be described. In this case, the normal integration mode is set in the mode register 53.

When the cell search operation is started, the correlator 2 detects correlation between its own spreading code of the mobile station and the reception signal. The detected correlation value is converted into a power value by the power conversion section 4. The power value output from the power conversion section 4 is repeatedly integrated by the power value integration section 5' a number of times corresponding to the number of slots set in advance in the integration count setting register 8. As a result, the power integration values at sampling points are stored in the RAM 7.

The power integration values stored in the RAM 7 are output to the DSP 25. The DSP 25 selects the largest power integration value from the power integration values at the sampling points, which are stored in the RAM 7. With this operation, the position of the sampling point corresponding to the power integration value can be recognized as the slot head portion of the transmission channel signal sent from the closest base station.

An operation in which the integration operation is interrupted will be described next. In this case, the integration cancel mode is set in the mode register 53. When this integration cancel mode is set, the value set in the integration count setting register 8 is neglected.

When the cell search operation is started, the correlator 2 detects correlation between its own spreading code of the mobile station and the reception signal. The detected correlation value is converted into a power value by the power conversion section 4. The power value output from the power conversion section 4 is integrated by the power value integration section 5' for one slot. The integrated power values at sampling points are input to the comparator 54 through the switch circuit 56 so that the power threshold value set in the integration limit value setting register 51 is compared with the power integration values in units of sampling points.

When there is a sampling point at which the power integration value calculated by the power value integration section 5' is larger than the power threshold value set in the integration limit value setting register 51, a path detection signal is output from the comparator 54, and the count value of the second counter 55 is incremented by one. It is determined whether the value of the second counter 55 has reached the number of paths set in the integration limit count setting register 52. If the count value has not reached the number of paths yet, the integration operation is continued.

After that, integration processing is performed in units of slots. When the count value of the second counter 55 has reached the number of paths set in the integration limit count setting register 52 in a certain slot, the integration operation is stopped at that time. When the integration operation is ended, the DSP 25 selects the largest power integration value from the power integration values at the sampling points, which are stored in the RAM 7. With this operation, the position of the sampling point corresponding to the power integration value is recognized as the slot head portion of the transmission channel signal sent from the closest base station.

As described above, according to the cell search scheme of this embodiment, the power threshold value and the path count threshold value are set in advance. In integration processing for each slot, it is determined whether the number of paths where the power integration value has reached the power threshold value has reached the predetermined path count threshold value. If the number of paths has reached the threshold value, the integration operation is stopped at that slot. In this case, when the signal reception sensitivity is high, the power integration value rapidly reaches the power threshold value, and the necessary number of paths is also rapidly ensured. For this reason, the integration time can be shortened, the cell search operation can be performed at a high speed, and power consumption can be reduced.

The contents of the integration limit value setting register 51, the integration limit count setting register 52, and the mode register 53 can be arbitrarily set. For example, the threshold value of user's choice can be freely selected by rewriting the contents of the setting registers 51 and 52. The mode of user's choice can also be freely selected by rewriting the contents of the mode register 53.

The threshold values in the integration limit value setting register 51 and the integration limit count setting register 52 may be automatically changed by firmware such as the DSP 25. For example, the quality of received speech is monitored by the DSP 25, and setting of the threshold values can be changed in accordance with the monitored quality of received speech. With this construction, when the received speech quality is poor, integration can be continued until a larger number of paths are detected.

For example, in a city where the density of buildings is high, the number of peaks in one slot is expected to increase. In this case, accurate cell search can be executed by setting a large path count threshold value. When the portable terminal is used in a rural area where a smaller number of reflected waves and interference waves are present, high-speed cell search can be executed by setting a small path count threshold value.

The contents of the integration limit value setting register 51, the integration limit count setting register 52, and the mode register 53 may be arbitrarily set through an external terminal 10. For example, when various threshold values are set through the external terminal 10 in testing before delivery of products, the default values of threshold values to be set in the integration limit value setting register 51 and the integration limit count setting register 52 can be verified.

Figure 7:
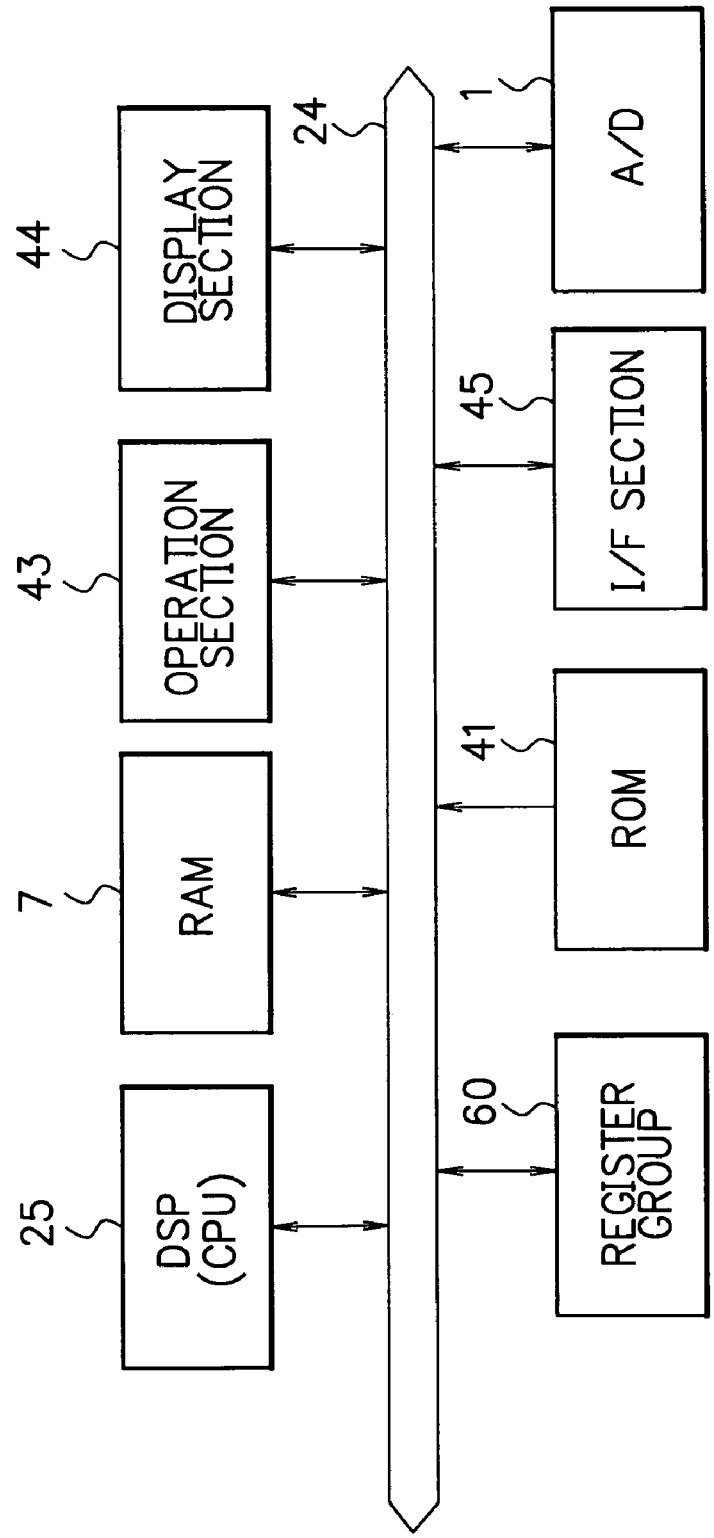
FIG. 7 is a block diagram showing an example of construction for realizing a cell search method according to the second embodiment by software.

As described above, the cell search method of this embodiment is realized by the circuit construction shown in FIG. 6. However, it can also be realized by operating a program stored in the RAM or ROM of a computer. FIG. 7 is a block diagram showing an example of construction for realizing the cell search method described with reference to FIG. 6 by software. The same reference numerals as in FIGS. 6 and 4 denote the same blocks in FIG. 7.

Referring to FIG. 7, a ROM 41 is a read-only memory that stores a program for executing the cell search operation of this embodiment and a variety of necessary data. The RAM 7 is a random access memory for temporarily storing various data obtained in the process of cell search operation based on the program or storing data finally obtained by cell search. The RAM 7 may store the program.

A register group 60 includes various registers such as the integration count setting register 8, the integration limit value setting register 51, the integration limit count setting register 52, and the mode register 53 shown in FIG. 6. An operation section 43 is used by the user to perform operations necessary for speech communication using the portable terminal or set desired values in the various registers 51 to 53 shown in FIG. 6. A display section 44 displays set contents in the various registers 51 to 53 or various messages.

The DSP (CPU) 25 mainly executes the operations of the cell search circuit shown in FIG. 6, or the process of detecting the maximum value from power integration values stored in the RAM 7 by cell search to find the slot head portion in accordance with the program stored in the ROM 41 or RAM 7. The DSP 25 also performs the above-described process of monitoring the quality of received speech and rewriting the contents of the registers 51 and 52 in accordance with the monitor result. In this case, the DSP 25 also executes the operations of the correlator 2 and the power conversion section 4. However, the correlator 2 and the power conversion section 4 may be provided independently of the DSP 25 and execute the operations.

An I/F section 45 performs the process of receiving a signal received by a reception section (not shown) or sending various signals to a transmission section (not shown). The I/F section 45 is also used to load the program with which the DSP 25 operates to provide the cell search function. For example, the program for realizing the cell search method of this embodiment is recorded on a recording medium such as a CD-ROM and supplied to the RAM 7 or a hard disk (not shown) through the I/F section 45. As the recording medium to which the program is supplied, not only a CD-ROM but also a floppy disk, a hard disk, a magnetic tape, an optical magnetic disk, or a nonvolatile memory card can be used.

Figure 8:
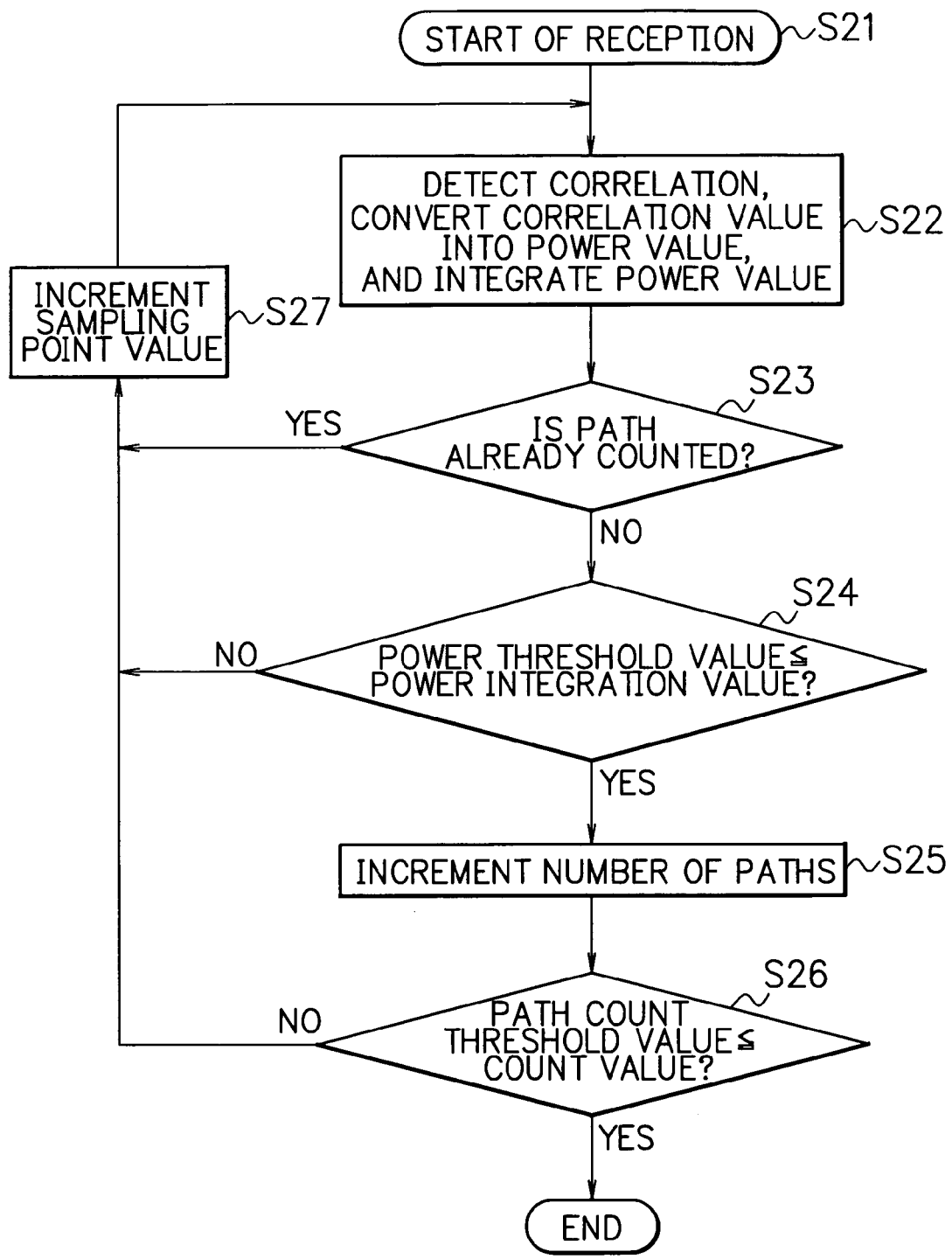
FIG. 8 is a flow chart of a cell search method according to the second embodiment, which is executed in an integration cancel mode.

FIG. 8 is a flow chart for explaining operation of executing cell search in the integration cancel mode by software processing.

Referring to FIG. 8, when reception of a transmission channel signal from the base station is started in step S21, for a sampling point under processing, correlation between its own spreading code of the mobile station and the reception signal is detected, and the correlation value is converted into a power value in step S22. Simultaneously, the power value is added to a power integration value calculated for the same sampling point to the preceding slot.

It is determined in step S23 whether the sampling point under processing has already been counted as a sampling point at which the calculated power integration value has reached the power threshold value set in advance. If YES in step S23, the flow advances to step S27 to process the next sampling point. The sampling point value is incremented by one in step S27, and the flow returns to step S22 to perform the same process as described above for the next sampling point.

If NO in step S23, the flow advances to step S24 to determine whether the power integration value calculated in step S22 has reached the power threshold value set in advance. When the power integration value is smaller than the power threshold value, the flow advances to step S27 to process the next sampling point. The sampling point value is incremented by one in step S27, and the flow returns to step S22 to perform the same process as described above for the next sampling point.

If YES in step S24, the flow advances to step S25 to increment the value of the counter for counting the number of sampling points (paths) at which the power integration value has reached the power threshold value. It is determined in step S26 whether the count value at that time has reached the path count threshold value set in advance.

If the counted number of paths is smaller than the path count threshold value, the flow advances to step S27 to process the next sampling point. In step S27, the sampling point value is incremented by one. The flow returns to step S22 to perform the same process as described above for the next sampling point. If the counted number of paths has reached the path count threshold value, the integration operation is then ended.

With the above processing, when the signal reception sensitivity is high, the integration time is shortened, and a high-speed cell search operation can be performed. Power consumption can be reduced accordingly.

In the second embodiment, two pieces of voltage information, i.e., the in-phase component I and the quadrature component Q obtained by the correlator 2 are converted into a power value, and the correlation value converted into the power value is integrated. However, the integration operation may be performed for each of the two correlation values, i.e., the in-phase component I and the quadrature component Q. In this case, two voltage threshold values to be compared with the integrated correlation value based on the voltage are prepared for the in-phase component I and the quadrature component Q, respectively.

In the second embodiment, a power integration value output from the adder 6 shown in FIG. 6 is supplied to the comparator 54. However, a power integration value read out from the RAM 7 may be supplied to the comparator 54. Alternatively, a power value output from the power conversion section 4 may be supplied to the comparator 54. The latter can cope with a case wherein when a transmission channel signal from the base station is sent using higher power, the power value calculated in units of slots may reach the power threshold value by itself even without integration for several slots.

In the second embodiment, a power integration value and control signal are stored in the RAM 7 in units of sampling points. The switch circuit 56 is opened/closed in accordance with the control signal read out from the RAM 7. However, the construction for preventing the same sampling point from being repeatedly counted is not limited to this example. For example, an AND circuit may be used in place of the switch circuit 56. A power integration value from the comparator 54 or the RAM 7 is input to one input terminal of the AND circuit, and a mask signal that becomes "0" for a counted sampling point is input to the other input terminal.

The third embodiment of the present invention will be described next with reference to the accompanying drawings.

Figure 9:
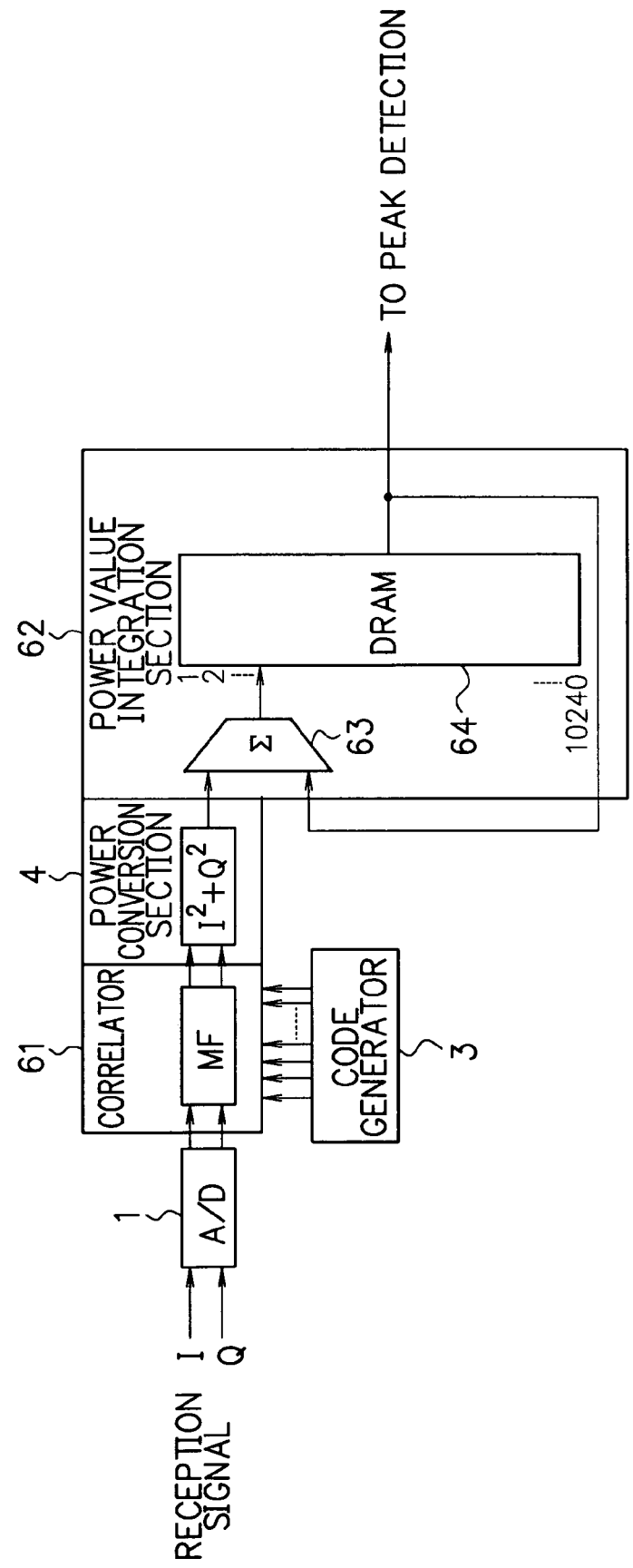
FIG. 9 is a block diagram showing the construction of a cell search circuit according to the third embodiment of the present invention.

FIG. 9 is a block diagram showing the construction of a cell search circuit according to the third embodiment that is a communication synchronization apparatus included in a portable terminal apparatus of the present invention. The same reference numerals as in FIGS. 3 and 6 denote the same blocks in FIG. 9.

As shown in FIG. 9, the cell search circuit of this embodiment comprises an A/D converter 1, a correlator 61, a code generator 3, a power conversion section 4, and a power value integration section 62. The correlator 61 and the power value integration section 62 are characteristic features of this embodiment.

The in-phase component I and the quadrature component Q of the voltage of a reception signal as shown in FIG. 1, which is transmitted from a base station (not shown), are limited to the frequency band of the signal sent from the base station through a bandpass filter (not shown) and supplied to the A/D converter 1.

The A/D converter 1 converts the above-described reception signal to a digital signal. The correlator 61 sequentially integrates digital signals input from the A/D converter 1 and the spreading code common to the mobile stations, which is generated by the code generator 3, in units of slots from the ON timing of a mobile station to perform despreading, so as to detect the correlation between its own spreading code of the mobile station and the reception signal. The correlator 61 is constructed by, e.g., a matched filter or a sliding correlator.

The power conversion section 4 calculates the square-sum of the in-phase component I and the quadrature component Q of the voltage output from the correlator 61 for each of 10,240 sampling points set in advance in a slot to obtain the power value of correlation.

The power value integration section 62 integrates, in units of sampling points, the power value output from the power conversion section 4 at each sampling point for several slots. The power value integration section 62 has a DRAM 64 for storing power integration values (integration correlation values) to the preceding slot, and an adder 63 for adding the power integration values up to the preceding slot which are stored in the DRAM 64 and the power values in the current slot supplied from the power conversion section 4 at the corresponding sampling points. Power values are integrated using the adder 63 and the DRAM 64.

More specifically, the correlation power values output from the power conversion section 4 in units of sampling points are stored in a power value memory constructed by the DRAM 64 sequentially from the start address. In this case, power values at 10,240 sampling points in one slot (625 μsec) are sequentially stored in the DRAM 64 of 10,240 words.

A peak point is extracted from the 10,240 correlation power values stored in the DRAM 64 to detect the slot head. The reliability is poor when only data of one slot is used, and the slot head may be erroneously determined. To prevent this, the correlation power values at the 10,240 points are integrated for several slots to improve the reliability of data used to detect the correlation peak.

The power integration values up to the preceding slot are read out from the DRAM 64 in units of sampling points and supplied to the adder 63. The power values at the same sampling point in the current slot are added and stored in the DRAM 64 again. Power values for, e.g., 32 slots are integrated, and a portion having the largest peak is finally recognized as the start portion of the transmission channel signal sent from the closest base station.

The characteristics of a DRAM will be described. In a DRAM, a memory cell as an internal storage element is constructed by a capacitor. For this reason, contents stored in memory cells disappear unless the memory cells are recharged every predetermined period. The operation of charging the capacitors every predetermined period is called refresh, and the cycle is called a refresh cycle.

DRAMs requiring refresh are conventionally used as a main memory or expansion memory of a personal computer or workstation. More specifically, when a DRAM is used, a control construction for refresh is required in addition to memory cells, and the load of control is large. Conventionally, in consideration of disadvantages in maintaining data in memory cells, a compact mobile communication terminal such as a portable telephone uses not a DRAM but an SRAM that requires no refresh operation.

However, when a scheme of integrating power values for several slots is used, as in the CDMA communication scheme, refresh control can be omitted by performing data access (the process of reading out power integration values up to the preceding slot from the DRAM 64, adding them to power values in the current slot supplied from the power conversion section 4, and writing the values) instead of refresh as a characteristic feature of the DRAM. In fact, since the time of one slot is 625 μsec and shorter than the refresh cycle, no refresh operation need be performed while integration is being performed.

In the final cycle of integration, the peak is detected while performing addition by the adder 63 10,240 times, and the address of the DRAM 64 corresponding to the peak point is stored in a static memory (e.g., an SRAM or a flip-flop not shown in FIG. 1). After that, the integration results at the 10,240 points can disappear on the DRAM 64. Hence, no refresh operation need be performed even after the final cycle of integration.

In this embodiment, the DRAM 64 is used as a power value memory in the power value integration section 62. As is known, the memory cells of the DRAM 64 can have a much simpler structure than those of an SRAM. The DRAM 64 of this embodiment can also omit the refresh control construction that is normally necessary.

Hence, the circuit area of the power value memory used for cell search can be largely reduced. Even in a portable terminal apparatus of wideband CDMA scheme requiring a relatively large memory capacity, the data memory can be realized with a size about ¼ that of an SRAM conventionally used as a power value memory.

Since the conventional FDMA or TDMA communication scheme requires not so large memory capacity, the circuit area rarely poses a problem even when an SRAM is used as the internal memory. To the contrary, the CDMA communication scheme requires a large memory capacity, and the circuit area becomes very large in use of an SRAM. The advantage obtained by forming the internal memory using the DRAM 64 is very large.

An example wherein the internal memory of the power value integration section 62 is formed from the DRAM 64 has been described above. Another data memory used in a portable communication terminal for which size reduction is required, and data access occurs at a cycle shorter than the refresh cycle can also be constructed using a DRAM. For example, the correlator 61 such as a matched filter for detecting correlation between the input digital signal and the common spreading code can also use a DRAM as an internal memory.

Figure 10:
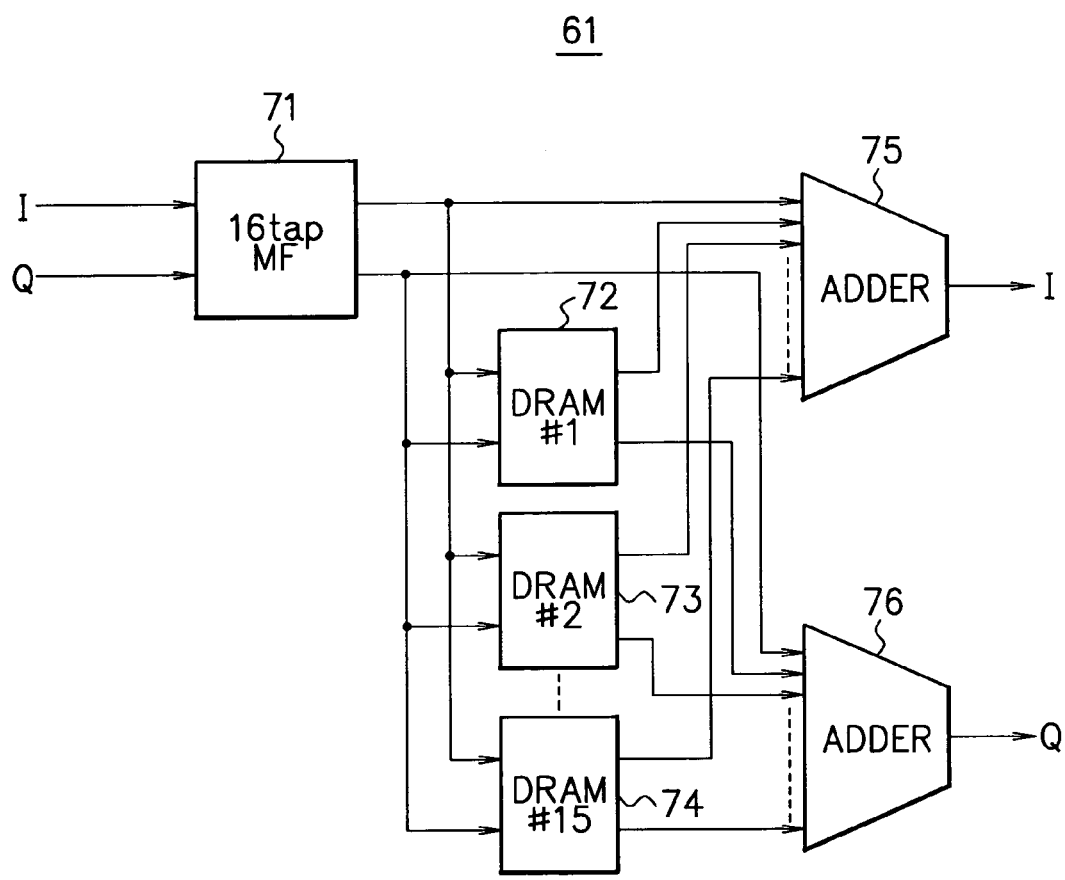
FIG. 10 is a block diagram showing the construction of a correlator according to the third embodiment.

FIG. 10 is a block diagram showing the construction of the correlator 61 according to the third embodiment. The correlator 61 of this embodiment has a 16-tap correlator 71, fifteen DRAMs #1 72 to #15 74, and two adders 75 and 76. Although the correlator 61 for calculating integration between the common spreading code and an input digital signal whose one symbol has 256 chips can be constructed as a 256-tap correlator, this makes the correlator 61 bulky. One slot is entirely spread by 256 chips. More specifically, one slot has sixteen consecutive data each spread by sixteen chips. In this embodiment, as shown in FIG. 10, integration is performed sixteen times using the 16-tap correlator 71, and the integration results are added and output.

The fifteen DRAMs 72 to 74 respectively store fifteen integration results sequentially calculated by the 16-tap correlator 71 for each of the in-phase component I and the quadrature component Q of the voltage. Each of the two adders 75 and 76 adds the first to fifteenth integration results stored in the DRAMs 72 to 74 to the sixteenth integration result currently output from the 16-tap correlator 71 and output the sum result. The adder 75 adds results for the in-phase component I of the voltage, and the adder 76 adds results for the quadrature component Q of the voltage.

As described above, in this embodiment, the internal memory of the power value integration section 62 is constructed by the DRAM 64, and additionally, the correlator 61 also uses the DRAMs 72 to 74 as the internal memory. As described above, the time of one slot is 625 µsec and is shorter than the refresh cycle. For this reason, when integration is being performed using the DRAMs 72 to 74, the refresh operation need not be performed. In the final cycle of integration as well, after all integration values are added by the adders 75 and 76 and output, the integration results in the DRAMs 72 to 74 can disappear. Hence, even after the final cycle of integration, the refresh operation need not be performed.

Hence, in this embodiment, the internal memory of the correlator 61 can also be realized with a very simple construction, and the circuit area of the memory used for cell search can be further reduced.

In the third embodiment, two pieces of voltage information, i.e., the in-phase component I and the quadrature component Q obtained by the correlator 61 are converted into a power value, and the correlation value converted into the power value is integrated. However, the integration operation may be performed for each of the two correlation values, i.e., the in-phase component I and the quadrature component Q.

In the first to third embodiments, initial cell search performed when the portable terminal is powered has particularly been described. However, the present invention can also be applied to cell search performed in a standby state.

The first to third embodiment can be individually applied or arbitrarily combined.

The cell search scheme of the present invention can be applied not only to mobile communication using a portable telephone or the like and satellite communication but also to a digital TV.

The constructions and connection relationships between the sections in the circuits of the first to third embodiments are merely examples for implementation of the present invention, and the technical scope of the present invention must not be limited to the specific embodiments. That is, various changes and modifications can be made without departing from the spirit and essential characteristics thereof.

What is claimed is:

1. A cell search method comprising the steps of:
   detecting correlation values between an input signal and a spreading code;
   comparing each of said detected correlation values with a threshold value to limit a subject of integration;
   performing the integration to a correlation value exceeding said threshold value and storing said integration value in a memory, while excluding a correlation value not exceeding said threshold value from the subject of the integration and not storing in a memory; and
   detecting a correlation peak value in a predetermined unit of slots by said integration values in said memory for a plurality of said slots.

2. A method according to claim 1, wherein a correlation value exceeding said threshold value is stored in a memory.

3. A method according to claim 2, wherein timing data on the timing at which said correlation value exceeds said threshold value is stored in a memory.

4. A method according to claim 3, wherein the detection process for correlation value is performed over several slots, the correlation values obtained in the slots are integrated to detect said correlation peak value, and, when the correlation value exceeds said threshold value in the first slot after starting the integration, the correlation value and the timing data corresponding to the correlation value are unconditionally stored in a new area on said memory.

5. A method according to claim 4, wherein the number of times of integration can be arbitrarily set.

6. A method according to claim 3, wherein the detection process for correlation value is performed over several slots, the correlation values obtained in the slots are integrated to detect said correlation peak value, and, when the correlation value exceeds said threshold value in any of the second and the subsequent slots after starting the integration and the timing data on the timing at which the correlation value exceeds said threshold value coincides with the timing data already stored in said memory, integration is performed with the correlation value already stored in said memory and the result is stored in the same area.

7. A method according to claim 3, wherein the detection process for correlation value is performed over several slots, the correlation values obtained in the slots are integrated to detect said correlation peak value, and, when the correlation value exceeds said threshold value in any of the second and the subsequent slots after starting the integration and the timing data on the timing at which the correlation value exceeds said threshold value does not coincide with the timing data already stored in said memory, the correlation value and the timing data corresponding to the correlation value are stored in a new area on said memory.

8. A method according to claim 1, wherein said threshold value can be arbitrarily set.

9. A communication synchronization apparatus comprising:
   a detection device that detects correlation values between an input signal and a spreading code generated by the detection device, and detects a correlation peak value in a predetermined unit of slots to detect a synchronization point of said input signal,
   a comparison section for comparing each of the detected correlation values with a predetermined threshold value to limit a subject of integration; and
   a performing section for performing the integration to a correlation value exceeding said threshold value and storing said integration value in a memory, while excluding a correlation value not exceeding said threshold value from the subject of the integration and not storing in a memory,
   wherein the detection device detects a correlation peak value in a predetermined unit of slots by said integration values in said memory for a plurality of said slots.

10. An apparatus according to claim 9, further comprising a first storage section for storing a correlation value exceeding said threshold value, obtained as a result of comparison by said comparison section.

11. An apparatus according to claim 10, further comprising a second storage section for storing timing data on the timing at which said correlation value exceeds the threshold value.

12. An apparatus according to claim 11, further comprising a correlation value integration section for performing the detection process for correlation value over several slots and integrating the correlation values obtained in the slots, wherein,
   when the correlation value exceeds said threshold value in the first slot after starting the integration, the correlation value and the timing data corresponding to the correlation value are unconditionally stored in new areas of said first and second storage sections, and, when the correlation value exceeds said threshold value in any of the second and the subsequent slots after starting the integration, if the timing data on the timing at which the correlation value exceeds said threshold value coincides with the timing data already stored in said second storage section, integration is performed with the correlation value already stored in said first storage section and the result is stored in the same area, and if the timing data on the timing at which the correlation value exceeds said threshold value does not coincide with the timing data already stored in said second storage section, the correlation value and the timing data corresponding to the correlation value are stored in new areas of said first and second storage sections.

13. An apparatus according to claim 12, further comprising a register for arbitrarily setting the number of times of integration.

14. An apparatus according to claim 12, wherein integration over several slots is started after activation of said apparatus.

15. An apparatus according to claim 11, wherein said first and second storage sections are provided in a single memory.

16. An apparatus according to claim 11, further comprising an overflow notification section for notifying a shortage of storage area in at least one of said first and second storage sections when it occurs.

17. An apparatus according to claim 9, further comprising a register for arbitrarily setting said threshold value.

18. An apparatus according to claim 9, further comprising an end notification section for notifying the completion of the detection process for said correlation peak value when the detection process is completed.

19. An apparatus according to claim 9, further comprising a registration count notification section for notifying the number of correlation values stored in said first storage section.

20. A computer-readable storage medium for a communication synchronization apparatus comprising:
a detection section that detects correlation values between an input signal and a spreading code generated by the detection section, and detects a correlation peak value in a predetermined unit of slots to detect a synchronization point of said input signal, said medium storing a program for causing a computer to realize a comparison function of comparing each of the detected correlation values with a predetermined threshold value to limit a subject of integration; and
a performing section for performing the integration to a correlation value exceeding said threshold value and storing said integration value in a memory, while excluding a correlation value not exceeding said threshold value from the subject of the integration and not storing in a memory,
wherein the detection section detects a correlation peak value in the predetermined unit of slots by said integration values in said memory for a plurality of said slots.

21. A medium according to claim 20, further storing a program for causing said computer to realize a control function of controlling to store a correlation value exceeding said threshold value, obtained as a result of comparison by said comparison function, in a memory.

22. A medium according to claim 21, further storing a program for causing said computer to realize a control function of controlling to store timing data on the timing at which said correlation value exceeds said threshold value, in a memory.

23. A cell search method comprising the steps of:
detecting correlation values between an input signal and a spreading code;
comparing each of said detected correlation values with a threshold value;
integrating a correlation value in a predetermined unit of slots in accordance with a result of said comparison; and
ending the process when the number of paths at which said integrated correlation value has reached a reference set value, reaches a path count set value.

24. A method according to claim 23, wherein comparison to check whether an integrated correlation value has reached said reference set value, is performed on the basis of power values.

25. A method according to claim 23, wherein comparison to check whether an integrated correlation value has reached said reference set value, is performed on the basis of voltage values.

26. A method according to claim 23, wherein said reference set value can be arbitrarily set.

27. A method according to claim 23, wherein said path count set value can be arbitrarily set.

28. A cell search method comprising the steps of:
detecting correlation values between an input signal and a spreading code;
comparing each of said detected correlation values with a threshold value;
integrating a correlation value in a predetermined unit of slots in accordance with a result of said comparison;
providing a first mode in which the process is ended when the number of paths at which said integrated correlation value has reached a reference set value, reaches a path count set value, and a second mode in which the process is performed a predetermined number of times.

29. A method according to claim 28, wherein said first and second modes can be arbitrarily selected and set.

30. A communication synchronization apparatus comprising:
a detection device that detects each slot in a predetermined unit, a correlation value between an input signal and a spreading code generated by the detection device, the detection process for correlation value is performed over several slots, the correlation values obtained in the slots are integrated to detect a correlation peak value, and thereby a synchronization point of said input signal is detected; and
a comparison section for comparing each of a calculated integrated correlation value with a reference set value and for comparing each of the detected correlation values with a predetermined threshold value to limit a subject of integration; and,
a performing section for performing the integration to a correlation value exceeding said threshold value and storing said integration value in a memory, while excluding a correlation value not exceeding said threshold value from the subject of the integration and not storing in a memory,
wherein the detection device detects a correlation peak value in a predetermined unit of slots by said integration values in said memory for a plurality of said slots.

31. An apparatus according to claim 30, further comprising a count section for counting the number of paths at which an integrated correlation value has reached said reference set value, obtained as a result of comparison by said comparison section.

32. An apparatus according to claim 31, wherein integration is ended when the count by said count section reaches a path count set value.

33. An apparatus according to claim 32, further comprising a register for arbitrarily setting said path count set value.

34. An apparatus according to claim 32, further comprising an external terminal for arbitrarily setting said path count set value.

35. An apparatus according to claim 30, further comprising a register for arbitrarily setting said reference set value.

36. An apparatus according to claim 30, further comprising an external terminal for arbitrarily setting said reference set value.

37. An apparatus according to claim 30, wherein comparison by said comparison section is performed on the basis of power values.

38. An apparatus according to claim 30, wherein comparison by said comparison section is performed on the basis of voltage values.

39. An apparatus according to claim 30, wherein said comparison section compares an integrated correlation value output from an adder for performing integration, with said reference set value.

40. An apparatus according to claim 30, wherein said comparison section compares an integrated correlation value output from a memory for storing calculated integrated correlation values, with said reference set value.

41. A communication synchronization apparatus comprising:
   a detection device that detects each slot in a predetermined unit, correlation values between an input signal and a spreading code generated by the detection device, the detection process for correlation value is performed over several slots, the correlation values obtained in the slots are integrated to detect a correlation peak value, and thereby a synchronization point of said input signal is detected; and
   a comparison section for comparing each of the detected correlation value or each of a value output from a power conversion device for converting the correlation value into a power value, with a reference set value, and for comparing each of the detected correlation values with a predetermined threshold value to limit a subject of integration; and
   a performing section for performing the integration to a correlation value exceeding said threshold value and storing said integration value in a memory, while excluding a correlation value not exceeding said threshold value from the subject of the integration and not storing in a memory,
   wherein the detection device detects a correlation peak value in the predetermined unit of slots by said integration values in said memory for a plurality of said slots.

42. A communication synchronization apparatus comprising:
   a detection device that detects each slot in a predetermined unit, a correlation value between an input signal and a spreading code generated by the detection process for correlation value is performed over several slots, the correlation values obtained in the slots are integrated to detect a correlation peak value, and thereby a synchronization point of said input signal is detected; and
   a first mode in which integration is ended when the number of paths at which an integrated correlation value has reached a reference set value, reaches a path count set value, and a second mode in which integration is performed a predetermined number of times.

43. An apparatus according to claim 42, comprising a register for arbitrarily selecting and setting said first and second modes.

44. An apparatus according to claim 42, comprising an external terminal for arbitrarily selecting and setting said first and second modes.

45. A computer-readable storage medium for a cell search operation comprising:
   a detection section that detects each slot in a predetermined unit, a correlation value between an input signal and a spreading code generated by the detection section, the detection process for correlation value is performed over several slots, and the correlation values obtained in the slots are integrated to detect a correlation peak value, said medium storing a program for causing a computer to realize a function of ending integration when the number of paths at which an integrated correlation value has reached a reference set value, reaches a path count set value.

* * * * *